C. E. Donnellans,
Tape Line Box.
No. 101,442. Patented Apr. 5, 1870.

Witnesses:
O. F. Mayhew
John Pillitt

Inventor:
Charles E. Donnellans

United States Patent Office.

CHARLES E. DONNELLAN, OF INDIANAPOLIS, INDIANA.

Letters Patent No. 101,442, dated April 5, 1870.

IMPROVEMENT IN TAPE-LINE BOXES.

The Schedule referred to in these Letters Patent and making part of the same

I, CHARLES E. DONNELLAN, of Indianapolis, in the county of Marion and State of Indiana, have invented certain Improvements in Tape-line Boxes, of which the following is a specification.

Nature and Objects of the Invention.

This invention relates to the box within which the tape-line is coiled, having for its object to simplify and cheapen its construction, and at the same time render it more durable, less liable to get out of order, and more convenient of access when repairs are required.

Description of the Accompanying Drawings.

Figure 1:
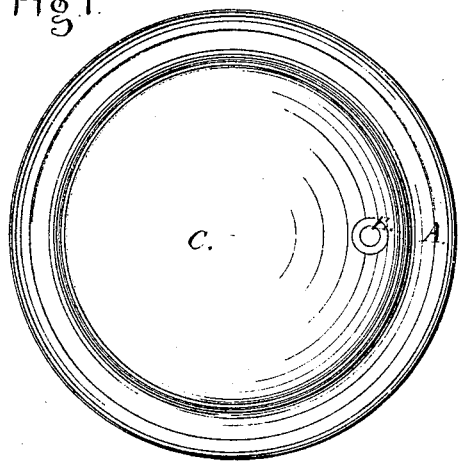
Figure 1 is a top view of the tape-line box, embodying my invention.
Figure 4:
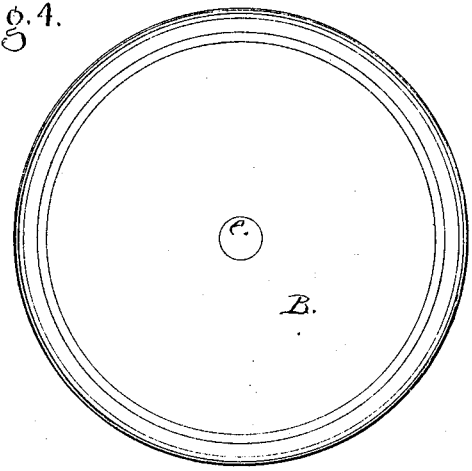
Figure 4 is an interior view of the bottom of the box.
Figure 2:
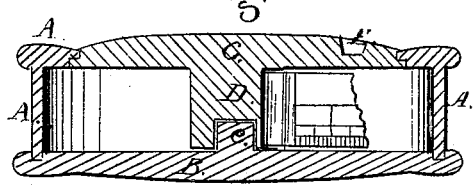
Figure 2 is a transverse section of the same.
Figure 3:
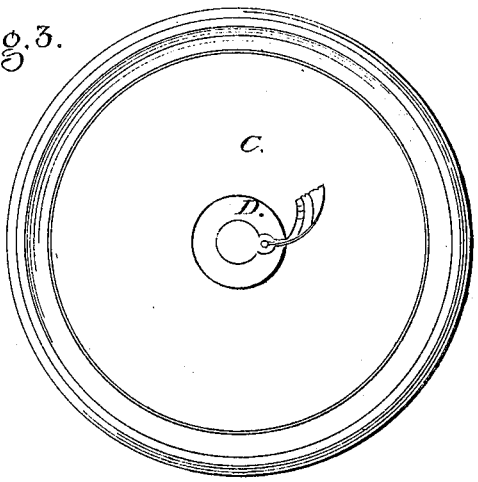
Figure 3 is a view of the interior of the box, with the bottom removed.

General Description.

The box may be made of wood, or any suitable material, and is composed of three parts, A, B, and C, the part A forming the sides or rim and a portion of the top; B, the bottom; and C, the central portion, forming part of the top and the central drum D, upon which the tape-line is wound, and also serving as the crank, by which the line may be wound up by inserting the end of the finger or a pencil in the countersink E.

The bottom B may be screwed onto the lower edge of the rim, or otherwise arranged, so as to be conveniently removable for the purpose of getting to the interior for repairs.

The lower end of the drum or spool D runs on a stud-pin, e, projecting inward from the bottom B.

The box may also be made by forming the bottom and side flanges in one piece, and making the top and center drum in another piece, and putting a screw through the top and drum into the stud-pin e, projecting inward from the bottom, thus holding the box together, at the same time allowing the top to be rotated as a crank to wind up the line, in the same manner as above stated.

Claim.

I claim as my invention—

The construction and arrangement of the side B and rim A of a tape-line box with the revolving disk or side C, having the attached drum or spindle D, for operation substantially in the manner herein shown and described.

CHARLES E. DONNELLAN.

Witnesses:
O. F. MAYHEW,
D. W. KNEFLER.